INVENTOR.
SAMUEL S. BALLARD

June 13, 1967  S. S. BALLARD  3,325,778
SEISMIC SONOBUOY

Filed Aug. 13, 1965  2 Sheets-Sheet 2

INVENTOR.
SAMUEL S. BALLARD
BY
ATTORNEY

United States Patent Office 3,325,778
Patented June 13, 1967

3,325,778
SEISMIC SONOBUOY
Samuel S. Ballard, Hollis, N.H., assignor to Sanders Associates, Inc., Nashua, N.H., a corporation of Delaware
Filed Aug. 13, 1965, Ser. No. 479,491
8 Claims. (Cl. 340—7)

ABSTRACT OF THE DISCLOSURE

This invention relates to a seismic exploration system of the type used in oceanographic surveys and employing an acoustical source and a plurality of pickup units in buoys, the pickup units receiving signals generated by the source and relaying them to a monitoring station. Each of the pickup units employs an amplifier unit having a level sensor. The gain of the amplifier unit is controlled by the magnitude of the received signals. For example, when the magnitude of the received signals is high, the amplifier gain becomes low; when the magnitude of the received signals is low, the amplifier gain becomes high, thus providing a system having a wide dynamic range.

Seismic underwater studies have taken on increased importance in recent years because of an enlarged general interest in oceanography. Such studies are also increasingly important in specific explorations, for example in searching for oil deposits beneath the ocean floor. The equipment includes a shock wave generator immersed in the water for the emission of shock waves therein. In its simplest form the generator may be an explosive charge which is detonated to develop the shock wave. One or more acoustical transducers disposed in the water at some distance from the shock wave source receive the signals directly from the source and also by way of reflections from the surface of the water, the bottom of the ocean and strata beneath the bottom. These signals are recorded and when analyzed to develop various items of information.

Prior to the present invention, seismic studies of the above type required the use of two ships, one carrying the acoustic source and another carrying a receiving transducer and associated equipment. If further receiving transducers were desired the number of ships would have to be correspondingly increased. This has resulted in an unduly large cost for studies made in this manner.

Accordingly, it is an object of the present invention to provide a seismic oceanographic exploration having a reduced cost of operation. A more specific object of the invention is to provide a system employing only a single ship.

Another object of the invention is to provide an exploration having a reduced cost of operation. A more specific object of the invention is to provide a system employing only a single ship.

Another object of the invention is to provide an exploration system of the above type in which the receiving transducers are suspended from buoys which relay the acoustical signals received by the transducers to a monitoring station by means of wireless transmission.

Yet another object of the invention is to provide a system of the above type in which the signals transmitted to the monitoring station faithfully reproduce the intercepted acoustical signals over a wide amplitude range.

A further object of the invention is to provide an acoustical pickup unit which picks up acoustical signals in the water and transmits them to a monitoring station in a system of the above type.

Other objects of the invention will in part be obvious and will in part appear hereinafter.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawings, in which.

In general, the invention employs a conventional acoustical generator in combination with one or more remotely positioned, unattended pickup units incorporated buoys. The pickup units pick up acoustical signals in the water by means of hydrophones suspended beneath the buoys and they transmit the signals to a central monitoring stations by means of a wireless arrangement. Specifically, the signals are transmitted on suitably modulated radio frequency carriers.

However, in order to reproduce the acoustical signals associated with underwater seismic exploration with sufficient fidelity to utilize fully the information contained therein, the system must have a dynamic range of the order of at least 100 db. This range is well beyond the capability of conventional amplitude and frequency modulation arrangements.

To overcome this problem, I have provided each acoustical pickup unit with a multiple gain amplifier unit, connected between the hydrophone and the transmitter modulator. In most cases a dual gain amplifier unit, having high-gain and low-gain modes, will suffice.

Over the lower half of the dynamic range of acoustical input signals, the amplifier unit operates in its high gain mode, with the gain being sufficient to match this half-range to the dynamic range of the modulation system used in the pickup unit. On the other hand, when the input signals are in the upper half of their dynamic range, the amplifier unit operates in its reduced gain mode so that again the half-range of acoustical signals matches the modulation range.

Accordingly, as the acoustical input signal increases from the lowest detectable level thereof, the corresponding electrical signal applied to the modulator in the pickup unit increases correspondingly. Then, before the signal exceeds the maximum level handled linearly by the modulator, the gain of the amplifier drops and the input to the modulator drops accordingly. As the acoustical level increases further, the modulator input once again increases in proportion thereto, on up to the highest acoustical level to be measured. Whether the amplifier unit is in its high or low gain mode is easily determined by making a visible recording of the electrical signal at the central monitoring station and inspecting it for points corresponding to the changes in gain.

Figure 1:
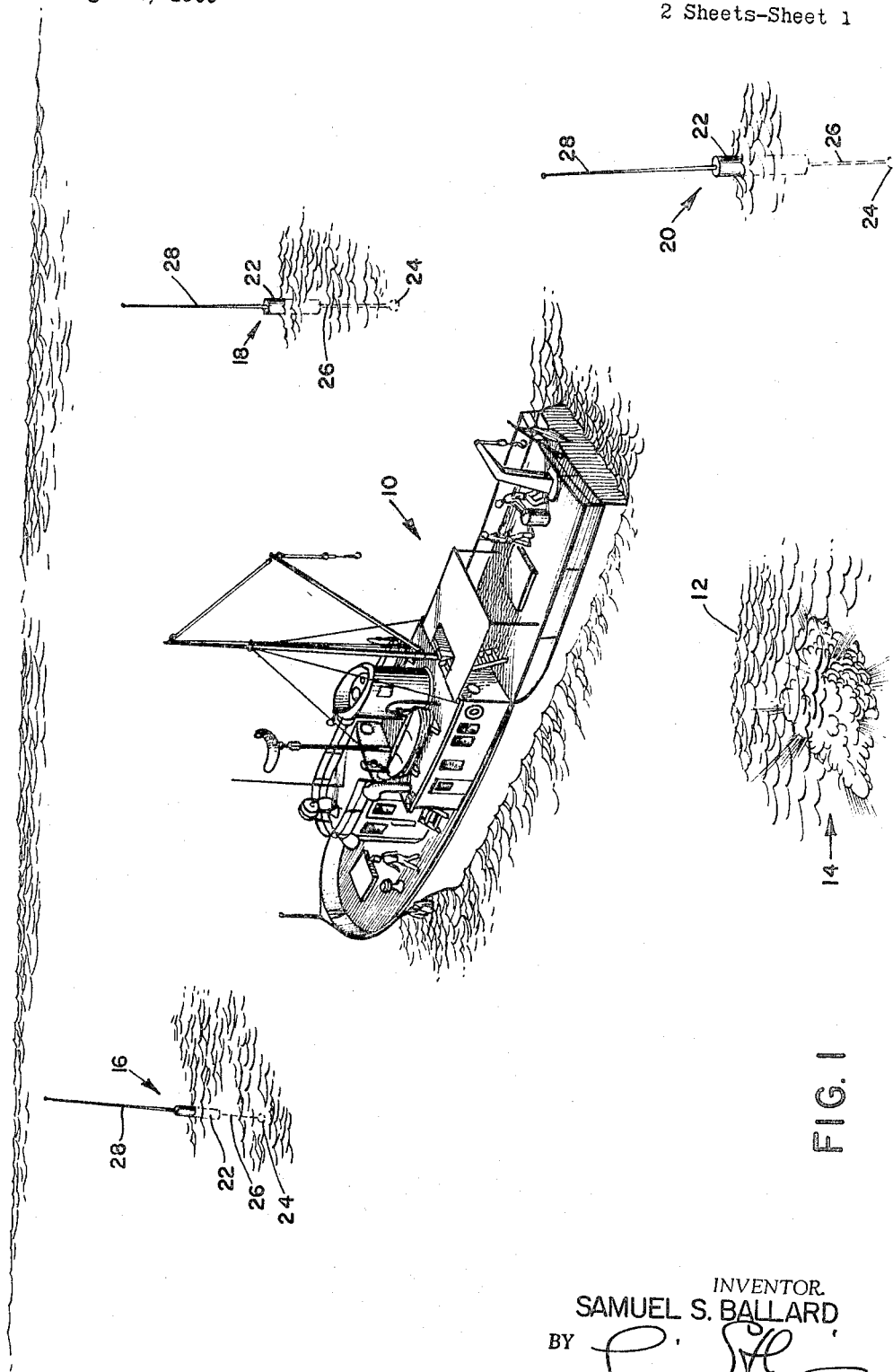
FIG. 1 is a pictorial, schematic representation of a seismic exploration system embodying the present invention.

As shown in FIG. 1, the system generally includes a ship 10 equipped to generate shock waves beneath the surface 12 of the ocean. Illustratively, this may be accomplished by means of an exploding depth charge as indicated at 14. The acoustical signals emanating from the depth charge 14 are intercepted by pickup units 16, 18 and 20. In turn, wireless signals corresponding to the acoustical signals are transmitted by the pickup units to a central monitoring station which, in the usual course of events, is located on the ship 10. The acoustical signals travel directly to the pickup units 16–20 and also indirectly by way of various reflections and refractions at the surface of the ocean, interfaces of various types within the water, the bottom of the ocean and even at various strata beneath the bottom.

Each of the pickup units 16–20 includes a buoy 22 from which a hydrophone 24 is suspended by means of a cable 26 of suitable length. A simple whip antenna 28 projects from the top of each buoy 22.

The drawing is not to scale, in that the pickup units are disposed substantially farther from the ship 10 than appears in FIG. 1. For example, this distance may be of the order of 30 miles. A distance of this magnitude is desirable both to provide the type of acoustical signal at the pickup units which is most useful for the intended purpose, and also to permit the ship 10 to generate a series of acoustical impulses at fairly widely spaced locations while still within the enclosure defined by the pickup units. With this range, it is desirable to employ low-cost, disposable pickup units which need not be retrieved after use. Taking into consideration such factors as range, cost, environmental conditions and the desirability of low transmitter power to prolong battery life, I have found that a transmitter carrier frequency in the VHF region provides optimum results. Specifically, a frequency of the order of 35 megacycles is highly suitable.

Figure 2:
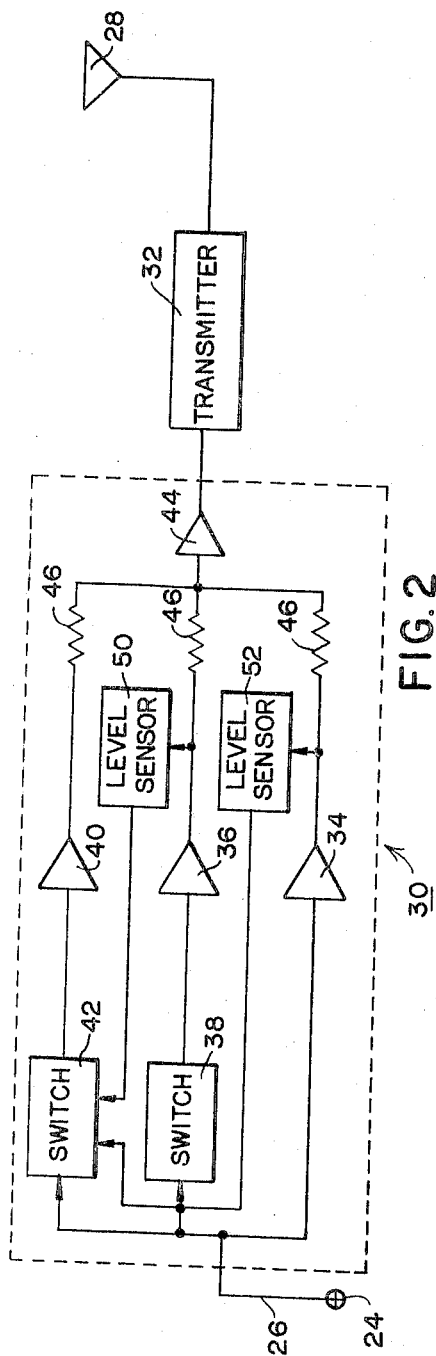
FIG. 2 is a schematic diagram of the circuit employed in one of the pickup units in the system of FIG. 1.

In FIG. 2, I have illustrated a circuit embodying the invention, which may be used in the pickup units 16–20 (FIG. 1). The electrical output of the hydrophone 24 is fed by the cable 26 to a multiple gain amplifier unit, and in turn, is passed to a transmitter 32 which includes a modulator and a carrier frequency generator, connected to provide an output in the form of a modulated carrier. The latter signal is fed to the transmitting antenna 28.

The amplifier unit 30 includes a low gain amplifier 34 receiving its signal directly from the cable 26, a second amplifier 36 deriving its input from the cable 26 by way of a switch 38 and a third amplifier 40 connected to the cable 26 by a switch 42. The outputs of the amplifiers 34, 36, and 40 are summed at the input of an amplifier 44 by means of resistors 46 operating in conjunction with the input resistance of the amplifier 44. The amplifier 40 has a high gain, the amplifier 36 an intermediate gain and the amplifier 34 a low gain. In fact, the amplifier 34 may actually have a gain of less than unity, in which case it may simply take the form of an attenuation network. The switches 38 and 42 are normally closed.

Operation of the amplifier unit 30 is as follows. Assume at the outset a low level output from the hydrophone 24. All switches are closed and combined outputs of the amplifiers 34, 36 and 40 are therefore delivered to the amplifier 44. The amplifier unit 30 thus has its maximum gain, which will provide intelligible modulation of the transmitter 32 with the weakest usable signal from the hydrophone 24.

As the output level of the hydrophone 24 increases, a point is reached where the input to the transmitter 32 exceeds the upper end of the dynamic range of the modulation system used therein. At or before this point a level sensor 50, arranged to emit a signal when the output of the amplifier 36 reaches the corresponding level, opens the switch 42, thereby cutting out the high gain amplifier 40. The gain of the amplifier unit 30 is thus reduced to a point where the relatively high output signal of the hydrophone 24 now corresponds to a modulation level in the transmitter 32 near the minimum usable value thereof.

With the output of the hydrophone 24 still increasing, the input to the transmitter 32 once again reaches the upper limit of the modulation range in the transmitter 32. The time a level sensor 52, similar to the sensor 50 but responsive to the output of the amplifier 34, opens the switch 38 and thus removes the amplifier 36 from operation. The sensor 52 is also connected to maintain the open conditions of the switch 42, inasmuch as the output of the sensor 50 ceases when the input of the amplifier 36 is interrupted. The over-all gain of the amplifier unit 30 is now reduced to its lowest level so that even the high level output of the hydrophone 24 provides a low modulation level in the transmitter 32. The dynamic range of transmitter modulation then corresponds to a similar range extending upward from this output level of the hydrophone.

As the output of the hydrophone 24 dimishes in magnitude, the reverse sequence takes place in the amplifier unit 30, i.e. the over-all gain increases in successive steps. As the input to the transmitter 32 approaches a point corresponding to the lower practical limit of modulation level, the output of the level sensor 52 is cut off and the switch 38 is closed, thereby reconnecting the amplifier 36. A further reduction in hydrophone output to a point again approaching the lower limit of transmitter modulation causes the sensor 50 to cut off its output signal, thereby closing switch 42 and reconnecting the amplifier 40. The amplifier unit 30 then operates at full gain once again.

The level sensors 50 and 52 are preferably of the Schmitt trigger or differential amplifier type, comprising a pair of transistors, one of which is conducting and the other nonconducting when the trigger is in its normal state. When the input to the normally nonconducting transistor exceeds a predetermined level, it conducts and the other transistor is cut off to place the trigger in its unstable state. This input signal is derived from the output of the amplifier 34 or 36, as the case may be, by way of a suitable rectifier which converts the A.C. output of the amplifier to a unidirectional signal. The sensor may also include an amplifier increasing the output signal of the trigger to a point suitable for operation of the switches.

All trigger circuits exhibit some degree of hysteresis. That is, if a first input level must be exceeded to shift the trigger to its unstable state, the signal level must drop to a point somewhat below the first level in order to return the trigger to its normal state. In the amplifier unit 30 a substantial amount of hysteresis is desirable in order to prevent repeated changes of amplifier gain when the output of the hydrophone 24 hovers at or near a point corresponding to such a change. While there are many ways of accomplishing this, I prefer to do it by means of a small voltage source which is switched on when the trigger shifts to its unstable state and thereby adds to the output of the rectifier connected to the normally nonconducting transistor. In this manner, one may obtain a spread of as much as 6 db between the signal levels causing a sensor to emit a control signal and cut it off.

In order to accommodate the hysteresis in the level sensors, the signal ranges corresponding to the different gains of the amplifier unit 30 should overlap by an appropriate amount. For example, consider the high and intermediate gains involving the sensor 50. Assume that the sensor opens the switch 42 just as the upper end of the dynamic range of transmitter modulation is reached, at a signal level from the hydrophone 24. Assume also that the sensor 50 has a hysteresis spread of 6 db. Then, when the amplifier unit 30 shifts to its intermediate mode, the transmitter input signal corresponding to a hydrophone output of X should be at least 6 db above the minimum level for transmitter modulation. Thus, when the output of the hydrophone 24 decreases, with the switch to high gain taking place at a hydrophone output of X–6, the signal level will not go below the value corresponding to minimum modulation usable before the switch takes place.

The switches 38 and 42 are preferably diode type switches. For seismic exploration work the amplifier unit 30 should have a frequency range of from 0 to 10,000 cps. In general, I prefer to use a simple frequency modulation arrangement in the transmitter 32.

As noted above, a dual gain arrangement for the amplifier unit 30 is suitable for many applications. The amplifier unit can then be simplified by eliminating, for example, the switch 42, amplifier 40 and level sensor 50. The gains of the amplifiers 34 and 36 would then be appropriately arranged for the two-level system.

Figure 3:
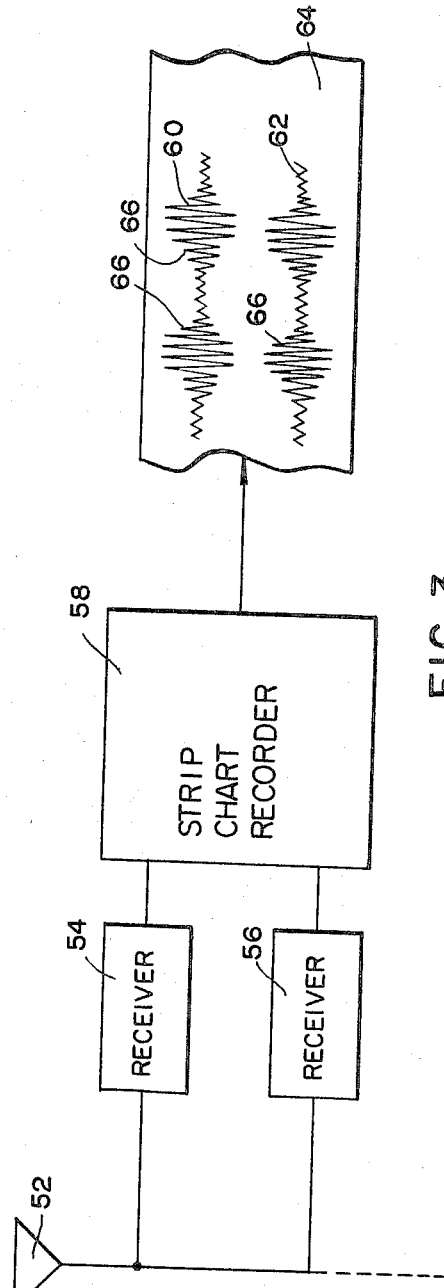
FIG. 3 is a schematic representation of a central monitoring unit which may be used in the system of FIG. 1.

The central monitoring station for the system is shown in FIG. 3. A receiving antenna 52 is connected to a plurality of receivers 54, 56, etc., one for each of the acoustical pickup units (FIG. 1). The pickup units transmit on slightly different frequencies and each of the receivers is tuned to one of these frequencies. The "audio" outputs of the receivers 54 and 56, corresponding to the signals from the hydrophones 24, are fed to a multiple trace strip chart recorder 58, which simultaneously records the outputs of the receivers 54 and 56 by means of separate traces 60 and 62 on a tape 64. The traces can then be analyzed when desired and at that time, the changes in gain of the amplifier units 30, visibly occurring at the points 66, can be taken into consideration.

With some additional complexity, the state of each amplifier unit 30 can be recorded alongside the corresponding trace on the tape 64. For example, the level sensors 50 and 52 (FIG. 2) can operate audio oscillators having frequencies outside the frequency range of the signals from the hydrophone 24, with the outputs of these oscillators being fed to the modulator in the transmitter 32. In the receivers of FIG. 3, suitable filters separate these gain-indicating audio signals from the hydrophone signals. Additional pens in the recorder 58 place marks on the tape 64 corresponding to the gain-indicating signals from the filters.

In another modification of the invention particularly useful in a dual gain system, the transmitter 32 can be provided with a frequency modulator and an amplitude modulator. One of these modulators, e.g. the frequency modulator, is used when the amplifier unit 30 is in its high gain mode. The low gain channel can feed the AM modulator directly thus eliminating the requirement for switching. However, this is done at the reduction of some dynamic range. The receivers 54 and 56 are each supplied with AM and FM detectors and a gain-indicating mark is placed on the tape 64 depending on which of the detectors is supplying the hydrophone signal to the strip chart recorder 58. In this connection it should be noted that a modulator has an effective gain and that the effective gains of the frequency and amplitude modulators may well be different. This factor should be taken into account in setting the relative gains of the amplifier unit 30 in its two modes of operation. More generally, the actual gains of the amplifier units 30 may be defined as including the effective gains of the modulators and this definition is used herein and in the claims.

It should also be noted that other multiple gain arrangements may be used. For example, a single multiple stage amplifier might be used, with the amplifier unit output being taken from alternate stages according to the mode determined by the level sensors.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

I claim:

1. A seismic exploration system comprising:
   (A) means for generating an underwater acoustical exploration signal,
   (B) an acoustical pickup unit comprising:
      (1) a buoy,
      (2) a hydroplane suspended from said buoy for reception of said signal,
      (3) a modulated transmitter disposed in said buoy,
      (4) an amplifier unit
         (a) disposed in said buoy,
         (b) connected to apply to said transmitter an amplified signal from said hydrophone,
         (c) including a relatively high-gain amplifier,
         (d) including a relatively low-gain amplifier,
         (e) including switching means for switching one of said amplifiers into and out of operation, and
         (f) including a level sensor controlling said switching means in accordance with the magnitude of the output of said hydrophone and being operable to provide
            (i) high gain when the output of said amplifier unit at said low gain corresponds to a modulation level in said transmitter below a predetermined minimum value thereof, and
            (ii) low gain when the output of said amplifier unit at said high gain corresponds to a modulation level above a predetermined maximum value thereof, 2. A seismic exploration system comprising:
   (A) means for generating an underwater acoustic exploration signal,
   (B) a plurality of acoustical pickup units, each pickup unit comprising:
      (1) a buoy,
      (2) a hydrophone,
      (3) means for suspending said hydrophone from said buoy for the reception of said signal,
      (4) a modulated transmitter disposed in said buoy,
      (5) an amplifier unit
         (a) disposed in said buoy,
         (b) connected to apply to said transmitter an amplified signal from said hydrophone,
         (c) including a high-gain amplifier,
         (d) including an intermediate-gain amplifier,
         (e) including a low-gain amplifier,
         (f) including switching means for switching said high- and intermediate-gain amplifiers into and out of operation, and
         (g) including level sensors controlling said switching means in response to the magnitudes of the outputs of said low- and intermediate-gain amplifiers and being operable to provide
            (i) high gain when the output of said amplifier unit at said intermediate gain corresponds to a modulation level in said transmitter below a predetermined minimum value of said level,
            (ii) intermediate gain when the output of said amplifier unit at said low gain corresponds to a modulation level below a predetermined minimum value thereof and the output of said amplifier unit at said high gain corresponds to a modulation level above a predetermined maximum value thereof, and
            (iii) low gain when the output of said amplifier unit at said intermediate gain corresponds to a modulation level above a predetermined maximum value thereof, and
   (C) signal processing means responsive to the signal transmitted by said transmitter.

3. A seismic exploration system in accordance with claim 2, wherein said low-gain amplifier is always in an operative state, and wherein said high-gain and intermediate-gain amplifiers operate in conjunction with said low-gain amplifier when said high-gain and intermediate-gain amplifiers are switched into their operative states.

4. An acoustical pickup unit for the detection of underwater acoustical signals and the transmission of wireless signals corresponding thereto, said pickup unit comprising:
- (A) a buoy,
- (B) a hydrophone suspended from said buoy,
- (C) a modulated transmitter disposed in said buoy,
- (D) an amplifier unit
  - (1) disposed in said buoy,
  - (2) connected to apply to said transmitter an amplified signal from said hydrophone,
  - (3) including a relatively high-gain amplifier,
  - (4) including a relatively low-gain amplifier,
  - (5) including switching means for switching said high-gain amplifier into and out of operation, and
  - (6) including a level sensor controlling said switching means in response to the magnitude of the output of said low-gain amplifier and being operable to provide
    - (a) high gain when the output of said amplifier unit at said low gain corresponds to a modulation level in said transmitter below a predetermined minimum value thereof, and
    - (b) low gain when the output of said amplifier unit at said high gain corresponds to a modulation level above a predetermined maximum value thereof.

5. A seismic exploration system in accordance with claim 4, wherein said low-gain amplifier is always in an operative state, and wherein said high-gain amplifier operates in conjunction with said low-gain amplifier when said high-gain amplifier is switched into its operative state.

6. A seismic exploration system comprising:
- (A) means for generating an underwater acoustical exploration signal,
- (B) an acoustical pickup unit comprising
  - (1) a buoy,
  - (2) a hydrophone suspended from said buoy for reception of said signal,
  - (3) a modulated transmitter disposed in said buoy,
  - (4) an amplifier unit
    - (a) disposed in said buoy,
    - (b) connected to apply to said transmitter an amplified signal from said hydrophone,
    - (c) including a relatively high-gain amplifier,
    - (d) including a relatively low-gain amplifier,
    - (e) including switching means for switching said high-gain amplifier into and out of operation, and
    - (f) including a level sensor controlling said switching means in response to the magnitude of the output of said low-gain amplifier and being operable to provide
      - (i) high gain when the output of said amplifier unit at said low gain corresponds to a modulation level in said transmitter below a predetermined value thereof, and
      - (ii) low gain when the output of said amplifier unit at said high gain corresponds to a modulation level above a predetermined maximum value thereof, 7. A seismic exploration system in accordance with claim 6, wherein said low-gain amplifier is always in an operative state, and wherein said high-gain amplifier operates in conjunction with said low-gain amplifier when said high-gain amplifier is switched into its operative state.

8. An acoustical pickup unit for the detection of underwater acoustical signals and the transmission of wireless signals corresponding thereto, said pickup unit comprising:
- (A) a buoy,
- (B) a hydrophone suspended from said buoy,
- (C) a modulated transmitter disposed in said buoy,
- (D) an amplifier unit
  - (1) disposed in said buoy,
  - (2) connected to apply to said transmitter an amplified signal from said hydrophone,
  - (3) including a relatively high-gain amplifier,
  - (4) including a relatively low-gain amplifier,
  - (5) including switching means for switching one of said amplifiers into and out of operation, and
  - (6) including a level sensor controlling said switching means in accordance with the magnitude of the output of said hydrophone and being operable to provide
    - (a) high gain when the output of said amplifier unit at said low gain corresponds to a modulation level in said transmitter below a predetermined value thereof, and
    - (b) low gain when the output of said amplifier unit at said high gain corresponds to a modulation level above a predetermined maximum value thereof.

References Cited

UNITED STATES PATENTS

| | | | |
|---|---|---|---|
| 2,424,705 | 7/1947 | Parr | 340—15.5 |
| 2,465,696 | 3/1949 | Paslay | 181—.5 |
| 2,956,237 | 10/1960 | Jacobs | 330—124 |
| 3,158,818 | 11/1954 | Plumpe | 330—29 |

RODNEY D. BENNETT, *Primary Examiner.*

RICHARD A. FARLEY, *Assistant Examiner.*